(12) United States Patent
Trim et al.

(10) Patent No.: US 11,227,197 B2
(45) Date of Patent: Jan. 18, 2022

(54) SEMANTIC UNDERSTANDING OF IMAGES BASED ON VECTORIZATION

(71) Applicant: International Business Machines Corporation, Armonk, NY (US)

(72) Inventors: Craig M. Trim, Ventura, CA (US); Aaron K. Baughman, Silver Spring, MD (US); Barry Michael Graham, Silver Spring, MD (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 16/053,249

(22) Filed: Aug. 2, 2018

(65) Prior Publication Data

US 2020/0042838 A1     Feb. 6, 2020

(51) Int. Cl.
*G06K 9/72*     (2006.01)
*G06K 9/62*     (2006.01)
*G06K 9/46*     (2006.01)
*G06N 3/04*     (2006.01)
*G06F 16/56*     (2019.01)

(52) U.S. Cl.
CPC ............ *G06K 9/726* (2013.01); *G06F 16/56* (2019.01); *G06K 9/46* (2013.01); *G06K 9/624* (2013.01); *G06K 9/629* (2013.01); *G06N 3/04* (2013.01)

(58) Field of Classification Search
CPC ........ G06F 16/55; G06F 16/56; G06F 16/583; G06N 3/04; G06N 3/0454; G06K 9/46; G06K 9/624; G06K 9/629; G06K 9/726; G06K 9/00718; G06K 9/00771; G06K 9/4628; G06K 9/6232; G06K 9/6262
See application file for complete search history.

(56) References Cited

U.S. PATENT DOCUMENTS

| | | | |
|---|---|---|---|
| 7,823,055 B2 | 10/2010 | Sull et al. | |
| 9,098,532 B2 * | 8/2015 | Cragun | G06K 9/00 |
| 9,508,010 B2 | 11/2016 | Lee et al. | |
| 9,836,671 B2 * | 12/2017 | Gao | G06F 40/30 |
| 10,303,756 B2 * | 5/2019 | Noshadi | G06K 9/00751 |
| 10,366,163 B2 * | 7/2019 | Chen | G06F 40/30 |
| 10,503,738 B2 * | 12/2019 | Jhamtani | G06F 16/40 |
| 10,540,445 B2 * | 1/2020 | Albouyeh | G06F 40/106 |
| 10,657,692 B2 * | 5/2020 | Delaney | G06F 40/30 |
| 10,831,821 B2 * | 11/2020 | Sewak | G06F 16/739 |
| 10,915,572 B2 * | 2/2021 | Santos Moraes | G06F 16/583 |
| 2005/0238238 A1 | 10/2005 | Xu et al. | |
| 2007/0273696 A1 | 11/2007 | Cheng et al. | |
| 2008/0016256 A1 | 1/2008 | Kumagai et al. | |

(Continued)

*Primary Examiner* — Ian L Lemieux
(74) *Attorney, Agent, or Firm* — Yee & Associates, P.C.

(57) ABSTRACT

Identifying words to accurately describe, with a range of specificity, an image is provided. A vector space corresponding to the image is generated using a convolutional neural network to extract a hierarchy of features ranging from broad to specific from the image. Closest vocabulary ranging from broad to specific are identified for the image using Huffman coding on the vector space. Accurate words ranging from broad to specific are identified that describe the image based on vocabulary output of the Huffman coding on the vector space. The accurate words ranging from broad to specific describing the image are output.

20 Claims, 5 Drawing Sheets

(56) References Cited

U.S. PATENT DOCUMENTS

| | | | |
|---|---|---|---|
| 2010/0063961 A1* | 3/2010 | Guiheneuf | G06F 16/58 |
| | | | 707/622 |
| 2014/0114643 A1* | 4/2014 | Baker | G06F 16/58 |
| | | | 704/9 |
| 2016/0358632 A1 | 12/2016 | Akhani et al. | |
| 2017/0235828 A1 | 8/2017 | Philipose et al. | |
| 2018/0143988 A1* | 5/2018 | Hoffman | G06F 16/24578 |
| 2018/0267997 A1* | 9/2018 | Lin | G06N 3/0454 |

* cited by examiner

SEMANTIC UNDERSTANDING OF IMAGES BASED ON VECTORIZATION

BACKGROUND

1. Field

The disclosure relates generally to deep learning and more specifically to providing deep semantic context learning and understanding in image recognition based on vectorization of input image data using artificial neural networks.

2. Description of the Related Art

Deep learning is a branch of machine learning based on a set of algorithms that attempts to model high-level abstractions in data by using artificial neural network architectures composed of multiple non-linear transformations. This machine learning can be supervised or unsupervised. Deep learning architectures have been applied to fields, such as, for example, computer vision, speech recognition, and natural language processing, where these architectures have produced results comparable to and in some cases superior to human experts.

Deep learning uses a cascade of multiple layers of processing nodes for feature extraction and transformation. Each successive layer of nodes uses the output from the previous layer of nodes as input. The deep architecture is organized as a graph. The nodes in the graph are connected by links to propagate activation, calculated at the origin, to the destination nodes. Each link has a weight that determines the relative strength and sign of the connection and each node applies an activation function to all of the weighted sum of incoming activations. The activation function is given as a hard threshold, a sigmoid function, or a hyperbolic tangent, for example.

Such deep architectures learn progressively and improve performance on task; by considering examples, generally without task-specific programming. For example, in image recognition, these deep architectures might learn to identify images that contain cats by analyzing example images that have been manually labeled as "cat" or "no cat" and using the results to identify cats in other images. These deep architectures are able to do this without any prior knowledge about cats, such as cats have fur, tails, whiskers and cat-like faces. Instead, these deep architectures evolve their own set of relevant characteristics from the training data that they process.

SUMMARY

According to one illustrative embodiment, a computer-implemented method for identifying words to accurately describe, with a range of specificity, an image is provided. A computer generates a vector space corresponding to the image using a convolutional neural network to extract a hierarchy of features ranging from broad to specific from the image. The computer identifies closest vocabulary ranging from broad to specific for the image using Huffman coding on the vector space. The computer identifies accurate words ranging from broad to specific that describe the image based on vocabulary output of the Huffman coding on the vector space. The computer outputs the accurate words ranging from broad to specific describing the image. According to other illustrative embodiments, a computer system and computer program product for identifying words to accurately describe, with a range of specificity, an image are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
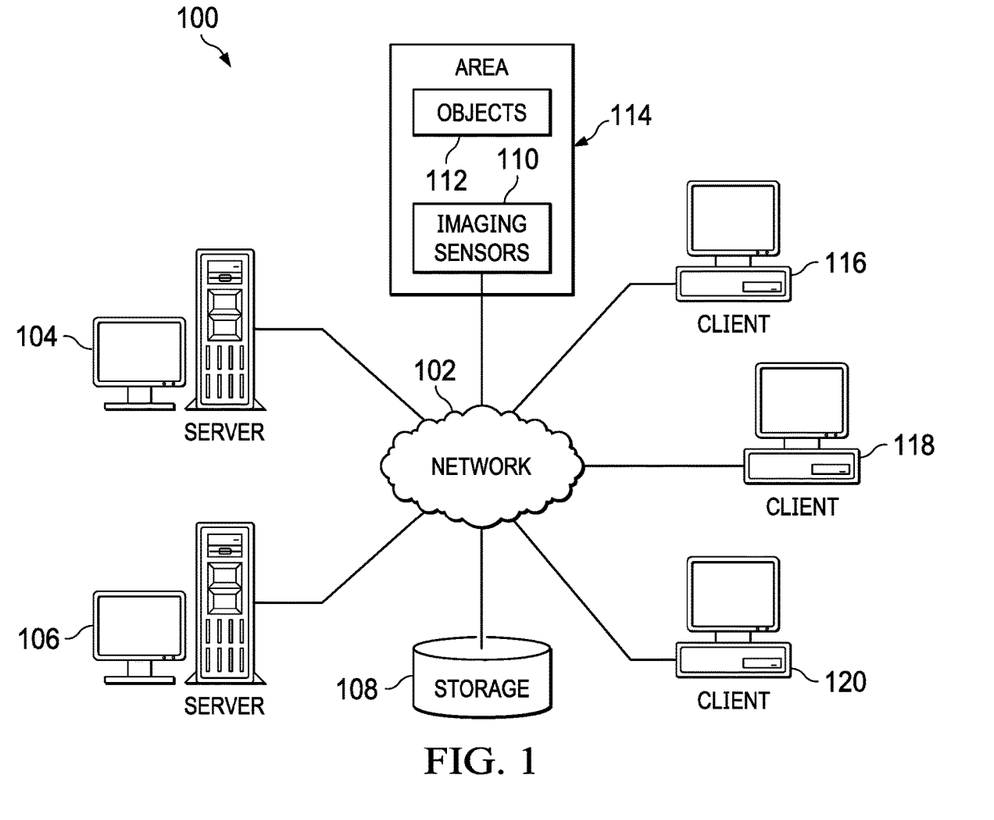
FIG. 1 is a pictorial representation of a network of data processing systems in which illustrative embodiments may be implemented.
Figure 2:
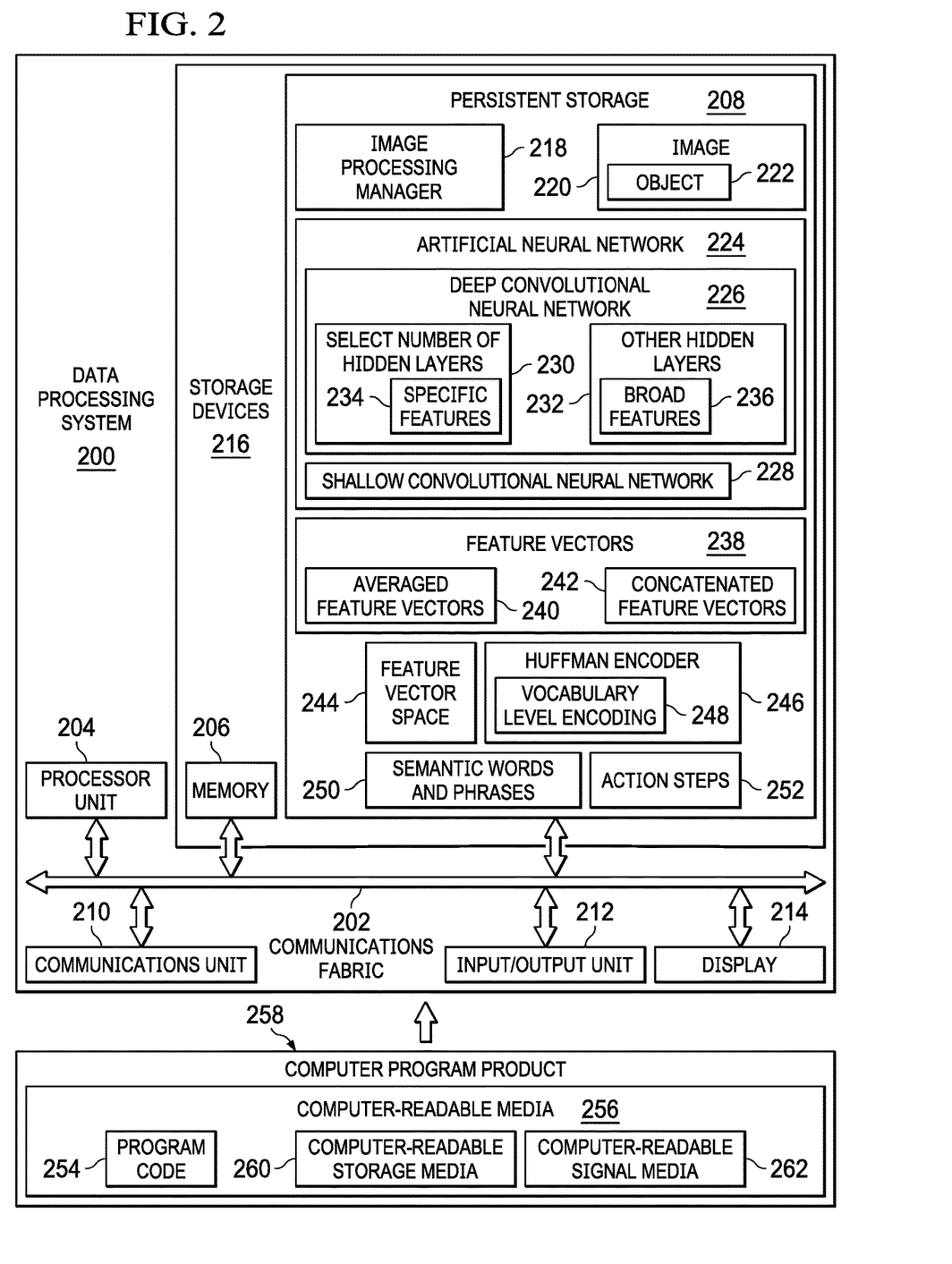
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, imaging sensors, and other devices in which the illustrative embodiments may be implemented. Network data processing system 100 contains network 102, which is the medium used to provide communications links between the computers, data processing systems, imaging sensors, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 provide a set of services to client devices. For example, server 104 and server 106 may provide image analysis services. Further, server 104 and server 106 may each represent a cluster of servers in a data center. Alternatively, server 104 and server 106 may represent computing nodes in a cloud environment.

In this example, server 104 and server 106 receive image data from imaging sensors 110 regarding objects 112 in area 114. Imaging sensors 110 represent a set of one or more imaging sensors and may include, for example, one or more of video cameras, still picture cameras, infrared cameras, and the like, which generate the image data. Objects 112 represent a set of one or more objects and may include, for example, one or more of animate objects, such as people and animals, and inanimate objects, such as vehicles and equipment. Area 114 represents a defined area or environment, such as a secure environment, a work environment, a recreational environment, an educational environment, a shopping environment, an industrial environment, an indoor environment, an outdoor environment, an underwater environment, and the like. It should be noted that server 104 and server 106 also may receive image data from other sources, such as, for example, network security services, network recommendation services, and social media websites connected to network 102, in addition to or instead of imaging sensors 110.

Server 104 and server 106 input the image data obtained from imaging sensors 110 into an artificial neural network, such as a convolutional neural network, to extract features corresponding to objects 112 captured in the image data. Afterward, server 104 and server 106 vectorize the extracted feature output of the artificial neural network and utilize Huffman coding to identify broad to specific vocabulary corresponding to the image data. Huffman coding is a lossless data compression algorithm. Huffman coding assigns variable-length codes to input symbols, lengths of the assigned codes are based on the frequencies of corresponding symbols. The most frequent symbol gets the smallest code and the least frequent symbol gets the largest code. In other words, Huffman encoding is a way to assign binary codes to symbols, which reduces the overall number of bits used to encode a typical string of those symbols. Huffman coding takes each symbol and its weight or frequency of occurrence and generates encodings for each symbol taking into account the weight of each symbol, so that higher weighted symbols have fewer bits in their encoding.

Client 116, client 118, and client 120 also connect to network 102. Clients 116, 118, and 120 are clients of server 104 and server 106. In this example, clients 116, 118, and 120 are illustrated as desktop or personal computers with wire communication links to network 102. However, it should be noted that clients 116, 118, and 120 are meant as examples only. In other words, clients 116, 118, and 120 may include other types of data processing systems, such as, for example, laptop computers, handheld computers, smart phones, smart watches, smart televisions, and the like, with wire or wireless communication links to network 102. Users of clients 116, 118, and 120 may utilize clients 116, 118, and 120 to access the image analysis services hosted by server 104 and server 106, view accurate broad to specific words or phrases describing the image data, and take appropriate action, if necessary, based on the words or phrases describing the image data. Further, server 104 and server 106 may provide other information, such as applications and programs, to clients 116, 118, and 120.

Storage 108 is a network storage device capable of storing any type of data in a structured format or an unstructured format. In addition, storage 108 may represent a plurality of network storage devices. Further, storage 108 may store identifiers and IP addresses for a plurality of imaging sensors, imaging data, training imaging data, a defined semantic words and phrases vocabulary, identifiers and IP addresses for a plurality of client devices; identifiers for a plurality of client device users; and the like. Furthermore, storage unit 108 may store authentication or credential data that may include user names, passwords, and biometric data, for example, associated with client device users, such as system administrators and security analysts.

In addition, it should be noted that network data processing system 100 may include any number of additional servers, clients, imaging sensors, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 116 over network 102 for use on client 116.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may include a graphics processing unit. Alternatively, data processing system 200 may include a graphics processing unit, in addition to or instead of processor unit 204, coupled to communications fabric 202.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores image analysis manager 218. However, it should be noted that even though image analysis manager 218 is illustrated as residing in persistent storage 208, in an alternative illustrative embodiment image analysis manager 218 may be a separate component of data processing system 200. For example, image analysis manager 218 may be a hardware component coupled to communication fabric 202 or a combination of hardware and software components. In another alternative illustrative embodiment, a first portion of image analysis manager 218 may be located in data processing system 200 and a second portion of image analysis manager 218 may be located in a second data processing system, such as server 106 or client 116 in FIG. 1. In yet another alternative illustrative embodiment, image analysis manager 218 may be located in client devices instead of, or in addition to, data processing system 200.

Image analysis manager 218 controls the process of deep semantic context learning in image analysis and recognition based on vectorization of input image data using a set of artificial neural networks. Image analysis manager 218 receives image 220 from, for example, one or more imaging sensors, such as imaging sensors 110 in FIG. 1, and/or other network sources. Image 220 may be, for example, a video comprising a plurality of image frames that include object 222, such as objects 112 in FIG. 1, or a set of one or more still photographs containing object 222. Object 222 represents a set of one or more objects within image 220.

Image analysis manager 218 utilizes artificial neural network 224 to extract features corresponding to object 222 from image 220. Artificial neural network 224 is a data processing algorithm. In an alternative illustrative embodiment, artificial neural network 224 is a hardware processing device. Artificial neural network 224 is organized in layers. The layers are made up of a number of interconnected nodes that contain an activation function. An activation function of a node defines the output of that node given the input. Image data patterns are presented to artificial neural network 224 via an input layer, which communicates to one or more hidden layers where the actual processing is done via a system of weighted connections. The hidden layers are internal representations of incoming image data. The hidden layers then link to an output layer where the answer is output.

Artificial neural network 224 modifies the weights of the connections according to the input image data patterns that it is presented with. Artificial neural network 224 learns via a supervised process that occurs with each cycle (i.e., each time artificial neural network 224 is run with a new input image data pattern) through a forward activation flow of outputs, and the backpropagation of weight adjustments. In other words, this is a two-step process where the inputs are fed into artificial neural network 224 via forward propagation and multiplied with initially random weights and biases before they are transformed via an activation function. Once the forward propagation is complete, the backpropagation step measures the error from the final output to the expected output by calculating the partial derivatives of the weights generating the error and adjusts them. In other words, backpropagation adjusts the weights by calculating the gradient of a loss function. Once the weights are adjusted, artificial neural network 224 repeats the process of the forward propagation and backpropagation steps to minimize the error rate until convergence.

More simply, when artificial neural network 224 is initially presented with an image data pattern, artificial neural network 224 makes a random guess as to what it might be. Artificial neural network 224 then determines how far its answer was from the actual one and makes an appropriate adjustment to its connection weights. Within each hidden layer node is an activation function, such as a sigmoid function, linear function, or rectified linear unit, which polarizes network activity and helps it to stabilize.

Once artificial neural network 224 is trained, image analysis manager 218 utilizes artificial neural network 224 to extract a set of features corresponding to object 222 from image 220, generate feature vectors from the extracted features, and create a single feature vector space. A feature is a measurable property or characteristic corresponding to an object, such as object 222. A set of features can be described by a feature vector. A feature vector is an n-dimensional vector of numerical features that represent object 222. In other words, a feature vector is an abstract numerical representation of object 222 having particular properties or characteristics. Numerical representation of object 222 facilitates efficient image processing and analysis. Feature values may correspond to, for example, pixels of image 220. A vector space is a set of feature vectors, which may be added together and multiplied by numbers called scalars.

In this example, artificial neural network 224 includes deep convolutional neural network 226 and shallow convolutional neural network 228. Convolution is a mathematical operation on two functions to produce a third function, which is typically viewed as a modified version of one of the original functions, giving an integral of the pointwise multiplication of the two functions as a function of the amount that one of the original functions is translated. Convolution has application in computer vision and image processing. Deep convolutional neural network 226 includes a plurality of different hidden layers, such as select number of hidden layers 230 and other hidden layers 232, whereas shallow convolutional neural network 228 includes only a single hidden layer.

Image analysis manager 218 utilizes select number of hidden layers 230 of deep convolutional neural network 226 to extract specific features 234 corresponding to image 220. Specific features 234 represent precise, low-level features corresponding to image 220, such as individual properties and characteristics of object 222. In addition, image analysis manager 218 utilizes other hidden layers 232 of deep convolutional neural network 226 to extract broad features 236 corresponding to image 220. Other hidden layers 232 represent a set of hidden layers other than select number of hidden layers 230 of deep convolutional neural network 226. Broad features 236 represent general, high-level features corresponding to image 220 as a whole, such as the overall scene corresponding to image 220.

Image analysis manager 218 utilizes shallow convolutional neural network 228 to generate a fixed length feature vector space corresponding to image 220 based on feature vectors 238. Image analysis manager 218 generates feature vectors 238 based on extracted specific features 234 and broad features 236. In this example, feature vectors 238 include averaged feature vectors 240 and concatenated feature vectors 242. Averaged feature vectors 240 represent an average of specific features extracted from select number of hidden layers 230 of deep convolutional neural network 226. Concatenated feature vectors 242 represent a catenation of averaged feature vectors 240 with feature vectors corresponding to broad features 236.

Image analysis manager 218 utilizes concatenated feature vectors 242 corresponding to image 220 to generate feature vector space 244. Feature vector space 244 may be, for example, a fixed length feature vector space. Image analysis manager 218 inputs feature vector space 244 into Huffman encoder 246 to generate vocabulary label encoding 248. Vocabulary label encoding 248 encodes vocabulary labels for different features of image 220.

Image analysis manager 218 utilizes vocabulary label encoding 248 to look up and identify semantic words and phrases 250. Semantic words and phrases 250 are a set of words and/or phrases that accurately describe, at a level of specificity from broad to specific, the content and context of image 220. Image analysis manager 218 applies semantic words and phrases 250 to image 220. In addition, based on semantic words and phrases 250, image analysis manager 218 may perform action steps 252 when semantic words and phrases 250 indicate a situation requiring attention. Action steps 252 represent a set of one or more procedures that image analysis manager 218 may perform to mitigate the situation indicated by semantic words and phrases 250. For example, image analysis manager 218 may send an electronic notification alerting security personnel. As another example, image analysis manager 218 may issue an audible warning to individuals in a defined area, such as area 114 in FIG. 1, monitored by data processing system 200. It should be noted that image analysis manager 218 may perform any number and combination of action steps to mitigate the situation indicated by semantic words and phrases 250.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Security systems, recommendation systems, and social networking websites are rich with multimedia video images. Many websites and services are beginning to offer streaming video that is played back using media players that can vary bandwidth usage depending on the network connection and end device capabilities, which may decrease resolution of the images producing low quality images. Typically, analysis of images is performed on video frames using standard image recognition techniques, which may include pixel extrapolation. Predictions, forecasts, or trends are generated based on these current video analysis techniques. However, because of fuzziness caused by low resolution images most of the semantic meaning of the context is lost, end class recognition is then required, and salient features may be missed when using current video analysis techniques, which may cause inaccurate predictions, forecasts, and trends.

Illustrative embodiments provide deep semantic context to an image recognition process using a defined vocabulary of words. Illustrative embodiments use the defined vocabulary of words to describe the image at different granularities, such as from a broad semantic context to a specific semantic context. Illustrative embodiments utilize the output of a deep convolutional neural network to generate a vector space of object features corresponding to an image to predict other objects within the image that are related to the image scene, to find criminal suspects within the image scene, or to semantically understand visual cues in the image scene, for example. For example, illustrative embodiments are able to identify objects that are most related to a scene in a video when illustrative embodiments add a feature vector space corresponding to a set of one or more objects in a first image frame of the video to a feature vector space corresponding to a set of one or more objects in a second image frame of the video. Similarly, illustrative embodiments are able to identify objects that are most related to a scene in a video when illustrative embodiments subtract a feature vector space corresponding to a set of one or more objects in a first image frame of the video to a feature vector space corresponding to a set of one or more objects in a second image frame of the video. In addition, illustrative embodiments can string together operators. An operator is a linear mapping that acts on elements of a feature vector space to produce other elements of the same feature vector space. Linear mapping is a mapping between two feature vector spaces that preserves the operations of addition and scalar multiplication.

Illustrative embodiments input an image or video frame into a convolutional neural network. The convolutional neural network extracts and learns hierarchical features of the image from broad features to specific features. Each hidden convolutional layer of the convolutional neural network has a convolve function for a series of neighborhood pixels, much like a Haar classifier. A Haar classifier is a machine learning approach for visual object detection in images. The Haar classifier rejects regions of an image that are highly unlikely to contain the object searched for by using a cascade of classifiers. In this cascade, early stages quickly reject the majority of false regions and object detection moves on to other regions. For example, the Haar classifier considers adjacent rectangular regions at a specific location in a detection window, sums up the pixel intensities in each region, and calculates the difference between these sums. The Haar classifier then uses this difference to categorize subsections of the image.

Illustrative embodiments extract all of the specific features of an image from a select number of hidden convolutional layers of the deep convolutional neural network. Illustrative embodiments average the extracted specific feature output of the select number of hidden layers and generate an averaged feature vector for the extracted specific features of the image. Concurrently, illustrative embodiments separately extract broader features of the image from other hidden convolutional layers of the convolutional neural network and generate a separate feature vector for the extracted broader features. Afterward, illustrative embodiments concatenate the averaged feature vector for the extracted specific features and the separate feature vector for the extracted broader features to produce a single feature vector space. Illustrative embodiments then split the single vector space into its feature components in order for illustrative embodiments to identify broad words and specific words corresponding to the content and context of the image. Further, illustrative embodiments apply a shallow convolutional neural network to the feature components to produce a fixed length feature vector space. Illustrative embodiments send the fixed length feature vector space to a Huffman encoder to look up closest vocabulary labels, from broad to specific, corresponding to the image scene. Illustrative embodiments utilize each resulting encoding to identify semantic words or phrases that accurately describe the image.

Thus, illustrative embodiments provide broad to specific semantic context image understanding, feature vector space arithmetic to identify semantic object relationships, Huffman encoding to determine nearest image vocabulary, deep correlation between objects and images, and identification of blurry objects in images by identifying visual cues in images to determine object identity. For example, if an identified visual cue of an image is a sidewalk, then illustrative embodiments can infer that a blurry object on the sidewalk is a person based on extracted features corresponding to the blurry object in the image. As a result, illustrative embodiments provide a technical improvement over current image analysis techniques by not relying on pixel extrapolation and utilizing image variable length encoding to fixed feature vector encoding, image feature vector space arithmetic, deep level feature discovery concatenation for broad to specific vocabulary, image summarization based on feature vector space arithmetic, semantic relationship pattern discovery based on feature vector space arithmetic, and deep convolutional neural network extracted feature output being input into a shallow convolutional neural network for feature vector representation.

Figure 3:
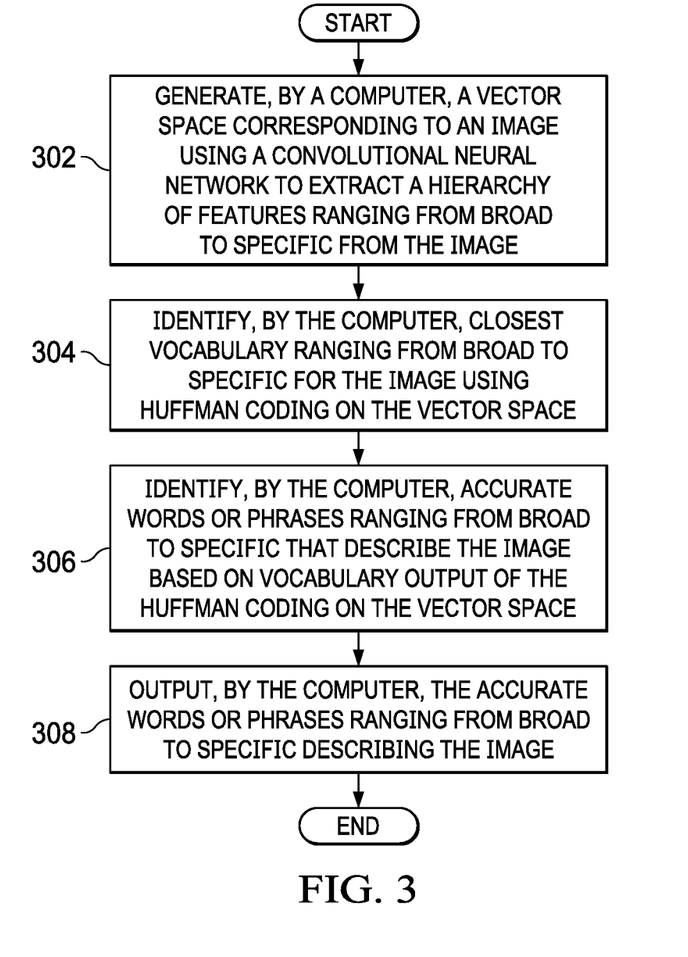
FIG. 3 is a flowchart illustrating a process for identifying words or phrases to accurately describe, with a range of specificity, an image in accordance with an illustrative embodiment.

With reference now to FIG. 3, a flowchart illustrating a process for identifying words or phrases to accurately describe, with a range of specificity, an image is shown in accordance with an illustrative embodiment. The process shown in FIG. 3 may be implemented in a computer, such as, for example, server 104 in FIG. 1 or data processing system 200 in FIG. 2.

The process begins when the computer generates a vector space corresponding to an image using a convolutional neural network to extract a hierarchy of features ranging from broad to specific from the image (step 302). The computer identifies closest vocabulary ranging from broad to specific for the image using Huffman coding on the vector space (step 304). The computer also identifies accurate words or phrases ranging from broad to specific that describe the image based on vocabulary output of the Huffman coding on the vector space (step 306). The computer outputs the accurate words or phrases ranging from broad to specific describing the image (step 310). The computer may analyze the words or phrases describing the content and context of the image to determine whether an action is required, and if so, perform the action. Alternatively, the computer may transmit the output to a client device user, such as, for example, a security analyst, for review and possible action.

Figure 4A:
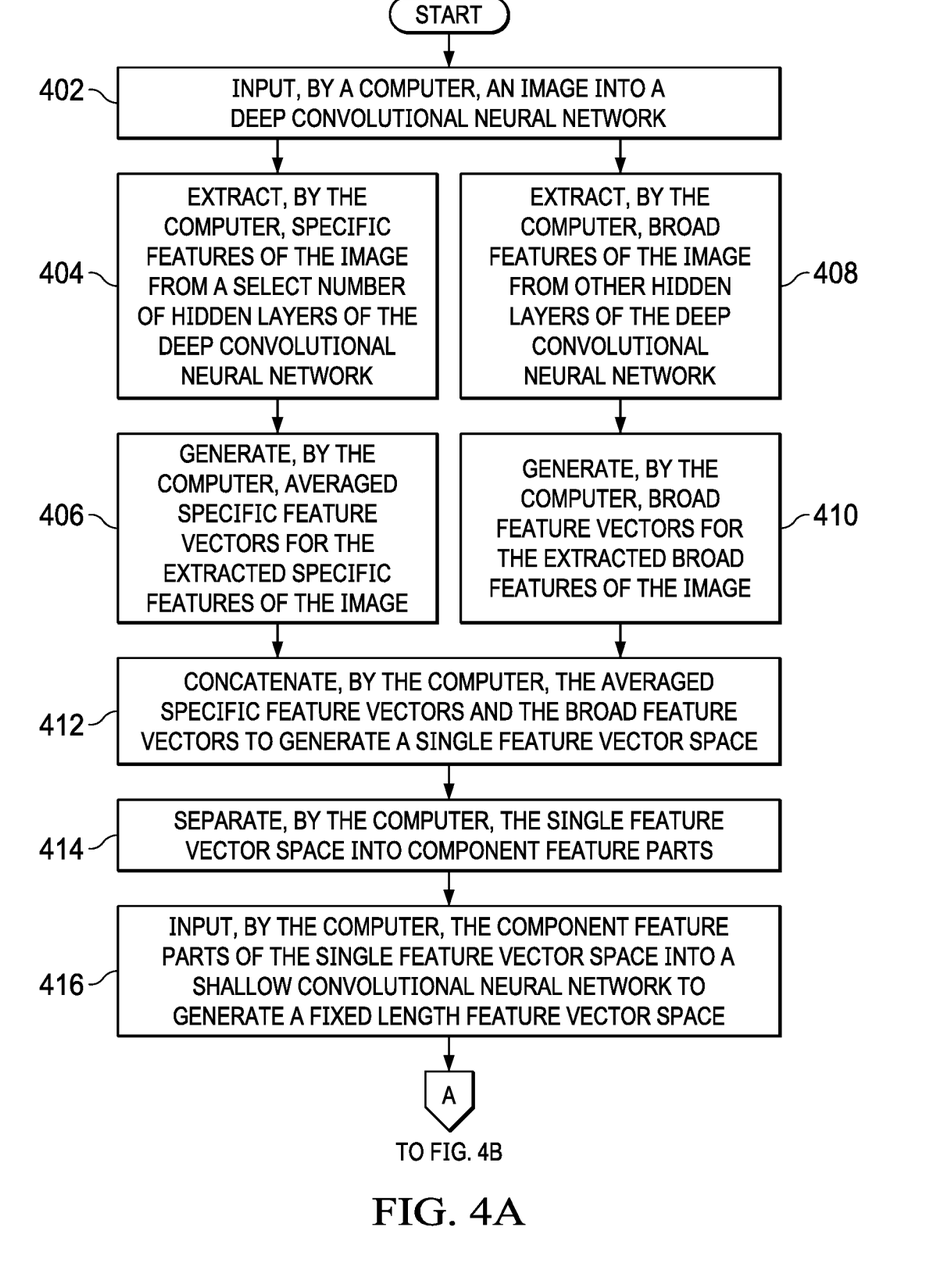
FIGS. 4A-4B are a flowchart illustrating a process for performing a set of actions to mitigate a situation indicated by the words or phrases describing the image in accordance with an illustrative embodiment.
Figure 4B:
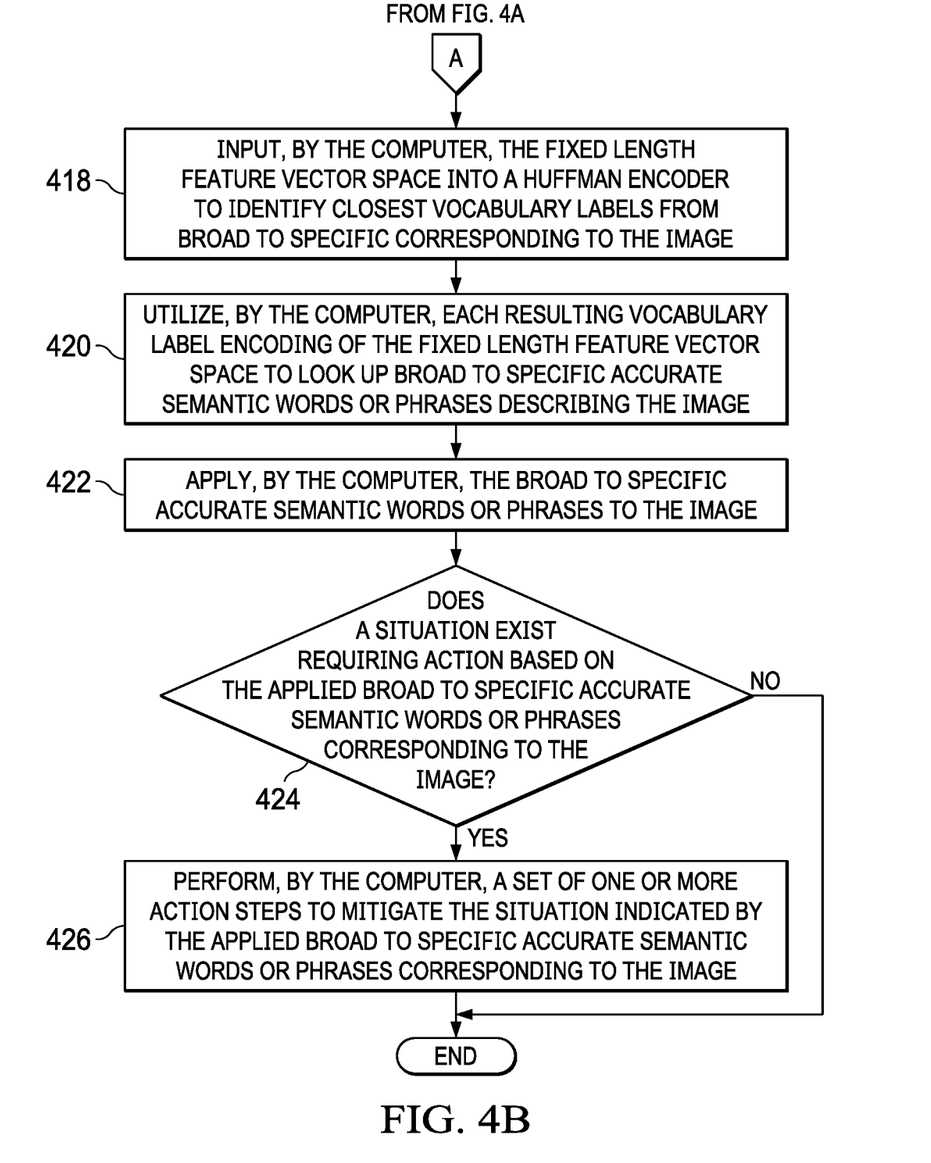

With reference now to FIGS. 4A-4B, a flowchart illustrating a process for performing a set of actions to mitigate a situation indicated by the words or phrases describing the image is shown in accordance with an illustrative embodiment. The process shown in FIGS. 4A-4B may be implemented in a computer, such as, for example, server 104 in FIG. 1 or data processing system 200 in FIG. 2.

The process begins when the computer inputs an image into a deep convolutional neural network (step 402). The computer extracts specific features of the image from a select number of hidden layers of the deep convolutional neural network (step 404). In addition, the computer generates averaged specific feature vectors for the extracted specific features of the image (step 406).

Further, the computer extracts broad features of the image from other hidden layers of the deep convolutional neural network (step 408). Furthermore, the computer generates broad feature vectors for the extracted broad features of the image (step 410). It should be noted that the computer may perform steps 404-406 and steps 408-410 concurrently or substantially at a same time. Alternatively, the computer may perform steps 404-410 sequentially.

Subsequently, the computer concatenates the averaged specific feature vectors and the broad feature vectors to generate a single feature vector space (step 412). Then, the computer separates or divides the single feature vector space into component feature parts (step 414). The computer inputs the component feature parts of the single feature vector space into a shallow convolutional neural network to generate a fixed length feature vector space (step 416).

Afterward, the computer inputs the fixed length feature vector space into a Huffman encoder to identify closest vocabulary labels from broad to specific corresponding to the image (step 418). The computer utilizes each resulting vocabulary label encoding of the fixed length feature vector space to look up broad to specific accurate semantic words or phrases describing the image (step 420). The computer applies the broad to specific accurate semantic words or phrases to the image (step 422).

The computer makes a determination as to whether a situation exists requiring action based on the applied broad to specific accurate semantic words or phrases corresponding to the image (step 424). If computer determines that a situation does not exist requiring action based on the applied broad to specific accurate semantic words or phrases corresponding to the image, no output of step 424, then the process terminates thereafter. If computer determines that a situation does exist requiring action based on the applied broad to specific accurate semantic words or phrases corresponding to the image, yes output of step 424, then the computer performs a set of one or more action steps to mitigate the situation indicated by the applied broad to specific accurate semantic words or phrases corresponding to the image (step 426). For example, if the computer determines that malicious activity is currently occurring in a secure area based on applied words or phrases corresponding to an image of the secure area, then the computer may automatically lock doors of the secure area, prevent access to electronic equipment and resources in the secure area, and notify security personnel regarding the current situation.

Thus, illustrative embodiments of the present invention provide a computer-implemented method, computer system, and computer program product for providing deep semantic context learning and understanding in image recognition based on vectorization of input image data using artificial neural networks. Illustrative embodiments discover specific and broad features of an image using a deep convolutional neural network. In addition, illustrative embodiments semantically classify the discovered specific and broad features. Then, illustrative embodiments learn the semantic contextual meaning between the specific and broad feature types. Further, the feature vector space of illustrative embodiments includes both high-level (broad) and low-level (specific) features in a catenation representation, which is new and novel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying words to accurately describe, with a range of specificity, an image, the computer-implemented method comprising:
   generating, by a computer, a vector space corresponding to the image using a convolutional neural network to extract a hierarchy of features ranging from broad to specific from the image;
   identifying, by the computer, closest vocabulary ranging from broad to specific for the image using Huffman coding on the vector space;
   identifying, by the computer, accurate words ranging from broad to specific that describe the image based on vocabulary output of the Huffman coding on the vector space; and
   outputting, by the computer, the accurate words ranging from broad to specific describing the image.

2. The computer-implemented method of claim 1 further comprising:
   inputting, by the computer, the image into a deep convolutional neural network.

3. The computer-implemented method of claim 2 further comprising:
   extracting, by the computer, specific features of the image from a select number of hidden layers of the deep convolutional neural network; and
   generating, by the computer, averaged specific feature vectors for the extracted specific features of the image.

4. The computer-implemented method of claim 3 further comprising:
   extracting, by the computer, broad features of the image from other hidden layers of the deep convolutional neural network, wherein the other hidden layers are different from the select number of hidden layers; and
   generating, by the computer, broad feature vectors for the extracted broad features of the image.

5. The computer-implemented method of claim 4 further comprising:
   concatenate, by the computer, the averaged specific feature vectors and the broad feature vectors to generate a single feature vector space.

6. The computer-implemented method of claim 5 further comprising:
   separating, by the computer, the single feature vector space into component feature parts; and
   inputting, by the computer, the component feature parts of the single feature vector space into a shallow convolutional neural network to generate a fixed length feature vector space.

7. The computer-implemented method of claim 6 further comprising:
   inputting, by the computer, the fixed length feature vector space into a Huffman encoder to identify closest vocabulary labels from broad to specific corresponding to the image; and
   utilizing, by the computer, each resulting vocabulary label encoding of the fixed length feature vector space to look up broad to specific accurate semantic words describing the image.

8. The computer-implemented method of claim 7 further comprising:

applying, by the computer, the broad to specific accurate semantic words to the image; and determining, by the computer, whether a situation exists requiring action based on the applied broad to specific accurate semantic words corresponding to the image.

9. The computer-implemented method of claim 8 further comprising:

responsive to the computer determining that a situation does not exist requiring action based on the applied broad to specific accurate semantic words corresponding to the image, taking, by the computer, no action.

10. The computer-implemented method of claim 8 further comprising:

responsive to the computer determining that a situation does exist requiring action based on the applied broad to specific accurate semantic words corresponding to the image, performing, by the computer, a set of one or more action steps to mitigate the situation indicated by the applied broad to specific accurate semantic words corresponding to the image.

11. A computer system for identifying words to accurately describe, with a range of specificity, an image, the computer system comprising:

a bus system;

a storage device connected to the bus system, wherein the storage device stores program instructions; and a processor connected to the bus system, wherein the processor executes the program instructions to:

generate a vector space corresponding to the image using a convolutional neural network to extract a hierarchy of features ranging from broad to specific from the image;

identify closest vocabulary ranging from broad to specific for the image using Huffman coding on the vector space;

identify, accurate words ranging from broad to specific that describe the image based on vocabulary output of the Huffman coding on the vector space; and output the accurate words ranging from broad to specific describing the image.

12. A computer program product for identifying words to accurately describe, with a range of specificity, an image, the computer program product comprising a computer readable storage medium having program instructions embodied therewith, the program instructions executable by a computer to cause the computer to perform a method comprising:

generating, by the computer, a vector space corresponding to the image using a convolutional neural network to extract a hierarchy of features ranging from broad to specific from the image;

identifying, by the computer, closest vocabulary ranging from broad to specific for the image using Huffman coding on the vector space;

identifying, by the computer, accurate words ranging from broad to specific that describe the image based on vocabulary output of the Huffman coding on the vector space; and outputting, by the computer, the accurate words ranging from broad to specific describing the image.

13. The computer program product of claim 12 further comprising:

inputting, by the computer, the image into a deep convolutional neural network.

14. The computer program product of claim 13 further comprising:

extracting, by the computer, specific features of the image from a select number of hidden layers of the deep convolutional neural network; and generating, by the computer, averaged specific feature vectors for the extracted specific features of the image.

15. The computer program product of claim 14 further comprising:

extracting, by the computer, broad features of the image from other hidden layers of the deep convolutional neural network, wherein the other hidden layers are different from the select number of hidden layers; and generating, by the computer, broad feature vectors for the extracted broad features of the image.

16. The computer program product of claim 15 further comprising:

concatenate, by the computer, the averaged specific feature vectors and the broad feature vectors to generate a single feature vector space.

17. The computer program product of claim 16 further comprising:

separating, by the computer, the single feature vector space into component feature parts; and inputting, by the computer, the component feature parts of the single feature vector space into a shallow convolutional neural network to generate a fixed length feature vector space.

18. The computer program product of claim 17 further comprising:

inputting, by the computer, the fixed length feature vector space into a Huffman encoder to identify closest vocabulary labels from broad to specific corresponding to the image; and utilizing, by the computer, each resulting vocabulary label encoding of the fixed length feature vector space to look up broad to specific accurate semantic words describing the image.

19. The computer program product of claim 18 further comprising:

applying, by the computer, the broad to specific accurate semantic words to the image; and determining, by the computer, whether a situation exists requiring action based on the applied broad to specific accurate semantic words corresponding to the image.

20. The computer program product of claim 19 further comprising:

responsive to the computer determining that a situation does exist requiring action based on the applied broad to specific accurate semantic words corresponding to the image, performing, by the computer, a set of one or more action steps to mitigate the situation indicated by the applied broad to specific accurate semantic words corresponding to the image.

* * * * *